Sept. 4, 1951 N. WISSMAN 2,566,647
COMBINATION FISHING ROD AND CONTAINER
Filed Aug. 27, 1947 2 Sheets-Sheet 1
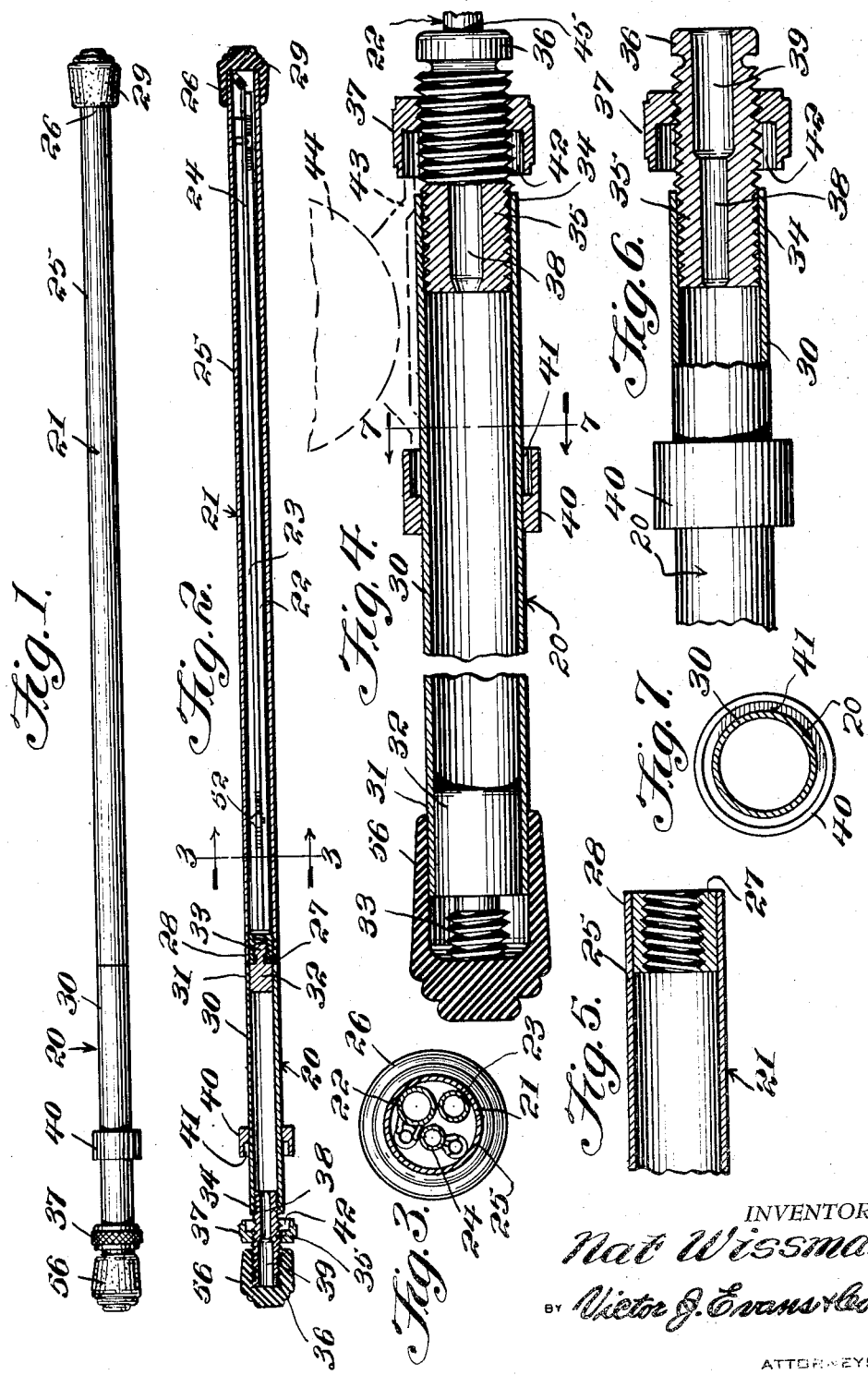
INVENTOR.
Nat Wissman,
BY Victor J. Evans & Co.
ATTORNEYS

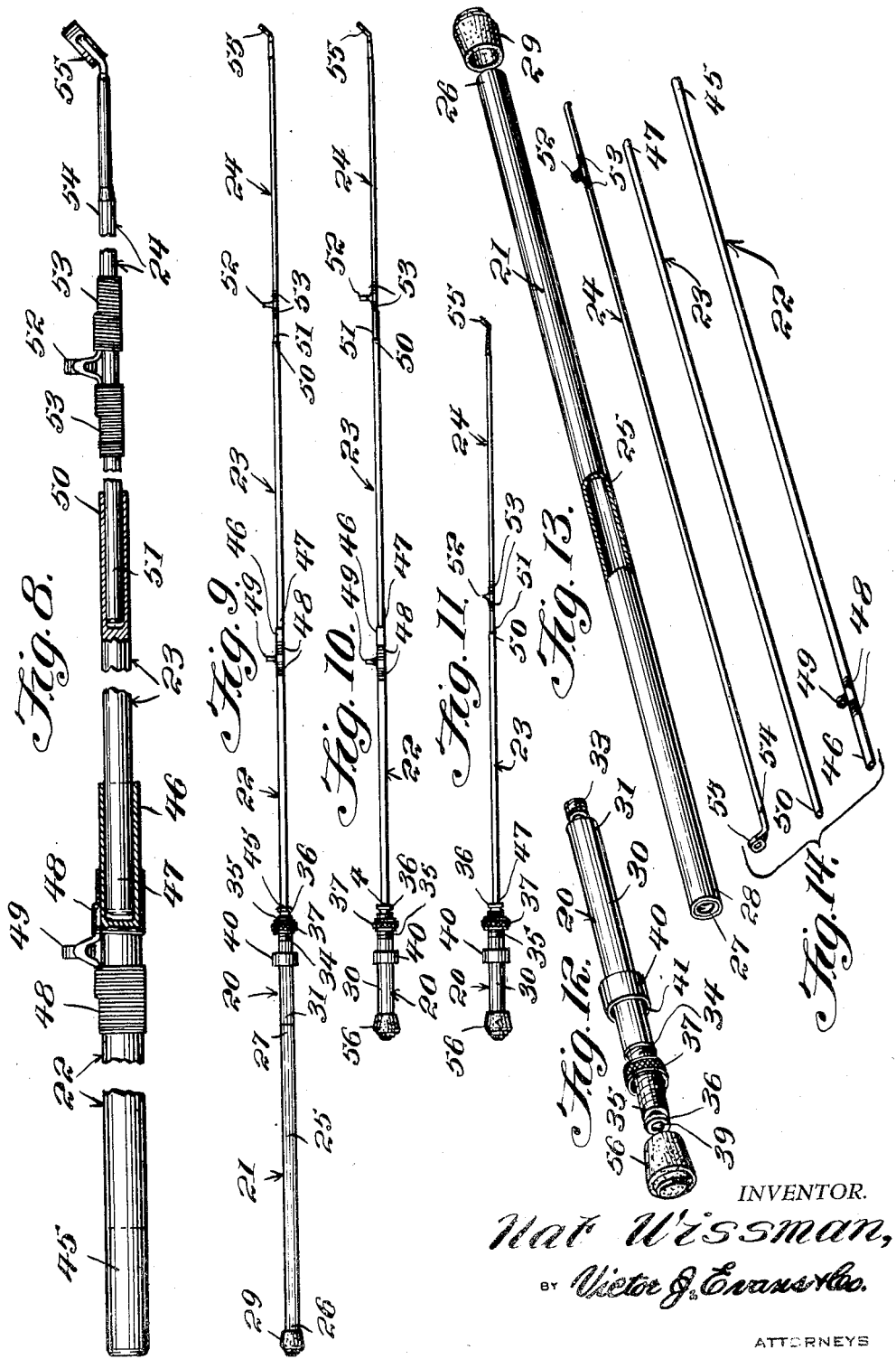

Patented Sept. 4, 1951

2,566,647

UNITED STATES PATENT OFFICE 2,566,647

COMBINATION FISHING ROD AND CONTAINER

Nat Wissman, Dallas, Tex.

Application August 27, 1947, Serial No. 770,804

1 Claim. (Cl. 43—18)

This invention relates to a combination fishing rod and container therefor.

An object of the invention is to provide a sectional fishing rod which can be assembled for use as an elongated fishing rod, fly rod or casting rod.

Another object of the invention is to provide a sectional fishing rod and to form one of the sections so that it will operate as a container for the other sections.

A further object of the invention is to provide a sectional fishing rod that, when assembled, for the easy transportation thereof, may be used as a walking stick in aiding the fresh water fisherman in their hikes to and from the fishing localities.

With the above and other objects and advantages in view, the invention consists of the novel details of construction, arrangement and combination of parts more fully hereinafter described, claimed and illustrated in the accompanying drawings in which:

Figure 1 is an elevational view of an embodiment of the invention as assembled for the transportation thereof;

Figure 2 is a longitudinal sectional view of Figure 1;

Figure 3 is a cross-sectional view on the line 3—3 of Figure 2;

Figure 4 is a longitudinal sectional view of the short handle portion and in dotted lines, the manner in which a reel is attached thereto;

Figure 5 is a detailed sectional view of one end of the long handle portion;

Figure 6 is a view partly in section of the rod section receiving end of the short handle;

Figure 7 is a sectional view on the line 7—7 of Figure 4;

Figure 8 is an elevational view partly in section and partly broken away, of the assembled rod sections;

Figure 9 is an elevational view of the invention as assembled into a fishing pole or long fishing rod;

Figure 10 is an elevational view of the invention as assembled for a fly rod;

Figure 11 is an elevational view of the invention as assembled for a casting rod;

Figure 12 is a perspective view of the short handle portion;

Figure 13 is a perspective view of the long handle portion and

Figure 14 is a perspective view of the rod sections.

Referring more in detail to the drawings, the embodiment of the invention to be further hereinafter described comprises the short handle section 20 shown in Figure 12, the long handle section 21 shown in Figure 13 and the rod sections 22, 23 and 24 respectively, shown in Figure 14.

The long handle section 21 comprises a light tubular metal body 25 which is fully open at the end 26, but has the internally threaded plug 27 suitably fixed therein at the opposite end 28.

The body 25 is of a sufficient length to receive the rod sections 22, 23 and 24 therein, and a rubber tip 29, when applied to the end 26, will retain the rod sections therein.

The short handle section 20 comprises a light tubular metal body 30 which is approximately one-third the length of the long handle portion 21. At the end 31 of the body 30, the plug 32 is suitably fixed therein and the plug is provided with the externally threaded portion 33 that is adapted to be threaded into the threaded bore of the plug 27.

At the opposite end 34 of the body 30, there is fixed therein as by a press fit, the externally threaded plug 35 having the collar 36 formed on its outermost end to retain the knurled reel retaining nut 37 on the threads of the plug. The plug 35 is provided with the centrally located and communicating bores 38 and 39 respectively, which are of different sizes, for a purpose to be later described.

Suitably fixed to the body 30, inwardly of the end 34, is a keeper collar 40, and this collar and the nut 37 are provided with recesses 41 and 42 respectively, which are adapted to be received over the mounting 43 of a reel 44, as shown in Figure 4, it being obvious that when the nut 37 is rotated clockwise on the threaded plug 35, that the reel will be firmly retained on the body 30.

The rod section 22 is provided with a solid end 45 receivable in the bore 39 of the plug 35, and a hollow end 46, which is adapted to receive the solid end 47 of the rod section 23. Secured to the rod section 22, adjacent the end 46, by suitable windings 48, is the line guide 49 which is used in the conventional manner. The rod section 23 is provided with a hollow end 50 to receive the solid end 51 of the rod section 24, and a line guide 52 is secured adjacent this end by suitable windings 53. Suitably fixed to the opposite end 54 of the rod section 24, is the guide tip 55 which is also used in the conventional manner.

There has thus been provided an all purpose fishing rod which will give to any fisherman by proper assembly any type of fishing rod that he desires.

If he desires a long fishing pole with which, under ordinary circumstances, a reel is not used, the rod is assembled as in Figure 9, the long handle portion 21 is connected to the short handle portion, and the tip 29 is placed over the end 26 of the portion 21. The rod sections are assembled in their proper relation to each other, and the pole is ready for fishing.

If the fisherman desired a fly casting rod, as shown in Figure 10, the long handle section 21 is removed, and a tip 56 is placed over the end 31 of the short handle portion, as more clearly shown in Figure 4, to protect the threaded portion 33 of the plug 32. The reel is attached, as shown in this figure, and the rod is ready for fishing.

If the fisherman desires a casting rod as shown in Figure 11, the rod section 22 is eliminated, and the end 47 of the rod section 23 is inserted in the bore 38 of the plug 35, the reel is attached as shown in Figure 4, and the rod is ready for fishing.

The handle portions and rod sections are made of a light, yet strong, metal, and the tips serve to protect the ends of the rod when necessary. All portions of the rod are of a length to avoid bulkiness, but of suitable lengths to form the rods previously described without excessive length or shortness of the rods.

The plug 35 having the different size bores permits the change of the type of rods in a simple and expeditious manner. The lightness of the assembly is an advantage to the weakest of users thereof, and its compactness, when assembled for transportation, as shown in Figure 1, makes it an ideal fishing equipment. The long handle portion serving as a container for the rod sections prevents bending of the rod sections which sometimes occurs when the conventional cloth container for rods is in use. The long handle portion is also water-proof to fully protect the rod sections, once they have been dried and placed therein. The long handle section as a container, therefore, possesses many advantages over the conventional fabric container now obtained with sectional fishing rods.

For fly fishermen who have to walk many miles during their trip, the rod provides a good walking stick, the top protecting the rod against damage when it is in contact with the ground.

Its compactness and lightness is a great asset to the fly fisherman, since even if he does not use it as a walking stick, it will not hinder him in his walk or become excessively heavy during his walk.

It is believed that from the foregoing description, the advantages and many uses of the invention, as well as the manner in which it is constructed and assembled will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A fishing rod assembly comprising a hollow short handle section having smooth bored outer ends and having plugs within the outer ends thereof, one of said plugs having a reduced extension extending axially of the section outside of one of the ends thereof, the other of said plugs being exteriorly threaded throughout its length, a portion of said threaded exterior having a press fit connection with the interior of the opposite end of the handle section, the remainder of the threaded plug being co-axial with and extending outwardly of said opposite end of the handle section, a nut having an annular recess having its inner cylindrical wall of greater diameter than the diameter of the handle section threaded on the outwardly extending threaded portion of the last named plug and adapted to be moved forward and away from said opposite end of the handle section, a collar having an annular recess fixedly secured around the handle section intermediate the ends thereof with the open end of the annular recess facing the open end of the annular recess of the nut, said recesses adapted to retain a reel seat on the handle section, said fully threaded plug having a central bore with different diameters at each end thereof adapted to receive rod sections of different diameters, and a long handle section received on the threaded portion of the first named plug, said long handle section adapted to receive a plurality of fishing rod sections.

NAT WISSMAN.

REFERENCES CITED

The following references are of record in the file of this patent:

UNITED STATES PATENTS

| Number | Name | Date |
|---|---|---|
| D. 154,065 | Phillips | June 7, 1949 |
| 468,529 | Beardsley | Feb. 9, 1892 |
| 814,321 | Pepper | Mar. 6, 1906 |
| 841,761 | Bartlett | Jan. 22, 1907 |
| 1,020,044 | McGuire | Mar. 12, 1912 |
| 1,306,354 | Robbins | June 10, 1919 |
| 1,527,463 | Bastman | Feb. 24, 1925 |
| 1,541,346 | Goldvogel | June 9, 1925 |
| 2,145,612 | Scogland | Jan. 31, 1939 |
| 2,409,940 | Kay | Oct. 22, 1946 |